(12) United States Patent
Lund

(10) Patent No.: US 8,869,840 B2
(45) Date of Patent: Oct. 28, 2014

(54) MODULE BASED BEND STIFFENER

(75) Inventor: Sjur Kristian Lund, Halden (NO)

(73) Assignee: Nexans, Paris (FR)

( * ) Notice: Subject to any disclaimer, the term of this patent is extended or adjusted under 35 U.S.C. 154(b) by 263 days.

(21) Appl. No.: 13/405,496

(22) Filed: Feb. 27, 2012

(65) Prior Publication Data

US 2012/0241037 A1 Sep. 27, 2012

(30) Foreign Application Priority Data

Mar. 21, 2011 (NO) .................................. 20110419

(51) Int. Cl.
*F16L 11/00* (2006.01)
*E21B 17/01* (2006.01)
*F16L 35/00* (2006.01)

(52) U.S. Cl.
CPC .............. *E21B 17/017* (2013.01); *F16L 35/00* (2013.01)
USPC .......................................... 138/110; 109/120

(58) Field of Classification Search
CPC ........ E21B 17/017; F16L 35/00; F16L 1/123; G02B 6/4478; G02B 6/3887; H02G 15/007
USPC .................. 138/110, 109, 120, 155
See application file for complete search history.

(56) References Cited

U.S. PATENT DOCUMENTS

| | | | | |
|---|---|---|---|---|
| 4,396,797 A | * | 8/1983 | Sakuragi et al. | 174/68.3 |
| 4,703,135 A | * | 10/1987 | Magnani et al. | 174/135 |
| 6,009,907 A | * | 1/2000 | Secher | 138/110 |
| 6,220,303 B1 | * | 4/2001 | Secher et al. | 138/110 |
| 7,469,722 B2 | * | 12/2008 | Berland | 138/155 |
| 2008/0142106 A1 | * | 6/2008 | Berland | 138/110 |

FOREIGN PATENT DOCUMENTS

| | | |
|---|---|---|
| EP | 0859182 | 8/1998 |
| GB | 2428760 | 2/2007 |
| WO | 0175262 | 10/2001 |
| WO | 2006033579 | 3/2006 |

* cited by examiner

*Primary Examiner* — Patrick F Brinson
(74) *Attorney, Agent, or Firm* — Sofer & Haroun, LLP

(57) ABSTRACT

A modular bend stiffener (100) includes a plurality of inflexible elements (120, 122) defining an elongate passage therein for accommodating one or more pipes or cables (170). The plurality of inflexible elements (120, 122) are coupled together in an elongate series via flexible elements (140) included between adjacent pairs of inflexible elements (120). The flexible elements (140) include one or more flexible pads (130) for enabling the stiffener (100) to flex laterally relative to an elongate axis of the stiffener (100) when in operation.

11 Claims, 7 Drawing Sheets

MODULE BASED BEND STIFFENER

RELATED APPLICATION

This application claims the benefit of priority from Norwegian Patent Application No. 2011 10419, filed on Mar. 21, 2011, the entirety of which is incorporated by reference.

BACKGROUND

1. Field of the Invention

The present invention relates to modular bend stiffeners, for example to modular bend stiffeners suitable for cables and pipes where they are anchored for avoiding damage due to stresses experienced by the cable and pipes as they flex and move in operation. Moreover, the present method concerns methods of installing aforementioned modular bend stiffeners onto cables and pipes.

2. Description of the Related Art

Bend stiffeners are conventionally employed for end terminations of cables and/or pipes. For example, bend stiffeners are employed on end terminations of cables hanging in operation from tension leg platforms (TLP), floating production vessels (FPSO), offshore wind turbines, offshore wave energy plant and so forth. These cables are subjected in operation to dynamic motions which cause cable tension and bending curvature, potentially resulting in eventual cable damage unless cable stiffeners are employed. Thus, cable stiffeners have a purpose to distribute such curvature due to dynamic motions along a length of cables so that a maximum stress due to bending is below a damage threshold for the cables.

A conventional bend stiffener is illustrated in FIG. 1 and indicated generally by 10. The stiffener 10 is fabricated from a robust flexible inert material, for example rubber, polyurethane, and is often of a tapered form with a central axial passage 20 for accommodating at least one pipe and/or cable 30. The tapered form renders the conventional bend stiffener 10 stiffest at its widest end 40, namely its proximate end, and most flexible at its thinnest end 50, namely its distal end. The bend stiffener 10 is attached to a major stationary component 60, for example an offshore platform, at its widest end 40, and the thinnest end is free to move as a distal portion of the bend stiffener 10. Thus, the conventional bend stiffener 10 is often a massive conical component manufactured from polyurethane plastics material.

Relatively few contemporary manufacturers have production facilities suitable for producing the conventional bend stiffener 10. Moreover, the bend stiffener 10 must be assembled to cables and terminations before they are loaded onto an installation vessel for being transported to theft location of eventual use. When cables are loaded onto drums, theft associated bend stiffeners require that larger drums have to be used which increases cost. There are length restrictions for conventional contemporary bend stiffeners on account of suppliers manufacturing equipment limitation.

Various types of bend stiffeners have been reported in earlier literature. For example, in a published United Kingdom patent application no. GB 2 428 760 A (Trelleborg CRP Ltd.), there is described an articulated centralizer for a pipe or other elongate member which is formed from a plurality of tubular bodies. Each body includes an axial through passage, and a plurality of such bodies is operable to be connected end-to-end to form a continuous elongate passageway. Each of the tubular bodies has a female-type connector portion at a first end thereof, and a male type connector portion at a second end thereof remote from the first end, wherein the male-type portion and the female-type portion are operable to mate with a degree of longitudinal and/or angular play. The centralizer includes securing means implemented as a mounting flange for fixing the centralizer with respect to a J-tube through which the centralizer is to pass. The centralizer is operable to centralize the elongate member in the J-tube and to maintain an allowable minimum bending radius for protecting the elongate member from bending damage and also reduce subsequent abrasion damage to the elongate member. The tubular bodies are beneficially manufactured from a polyurethane elastomer material. Moreover, the portions have mutually similar size.

In a published international POT patent application no. WO 2006/033579 (Marine Subsea Group AS), there is described a bend stiffener which is adapted to surround an end portion of an elongate cylindrical object, for example a flexible pipe or a cable, extending from a subsea installation to a surface vessel. The bend stiffener is connected to an end piece or end flange of the elongate object at a connection to the vessel. The bend stiffener is provided by a plurality of inner cylindrical clamps and associated outer cylindrical clamps which surround the elongate object when installed. Moreover, the clamps include longitudinal grooves for receiving spring rods therebetween. The spring rods are disposed in operation parallel to the elongate cylindrical object so that the elongate cylindrical object is protected by the spring rods from external damage, and the spring rods also limit a radius of curvature of the elongate object when it is subject to lateral stresses. The spring rods exhibit a substantially similar compliance along their length, although axial distances between the clamps along the elongate object are potentially susceptible to being varied.

In a published international PCT patent application no. WO 01/75262 A1, there is described a bend stiffener suitable for use in association with a riser in offshore oil and gas recovery. The stiffener comprises a tubular member adapted to engage the riser, wherein the riser comprises a plurality of parts which are mutually coupled together in use for providing the tubular member. The parts are manufactured from polyurethane material. Moreover, the tubular member is of a conical tapered form from its first end to its second end, but with a central axial passage of substantially constant diameter along the stiffener.

In a published European patent application no. EP 0859 182 A2, there is described a bend stiffener implemented to include an elongate frusto-conical polyurethane body which is moulded around an adhered metal connecting sleeve at one end. The elongate body has an elongate central axial aperture for receiving an end portion of a pipe. Moreover, the body is formed of several pre-formed sections which are secured together in operation to form the frusto-conical body. It is alleged that it is easier to manufacture the bend stiffener because the sections are smaller than the entire frusto-conical body itself, thereby shortening solidifying time during manufacture and rendering transport easier in comparison to transporting the frusto-conical body if it were manufactured as a unitary component.

Many of the aforementioned bend stiffeners are manufactured from relatively massive polyurethane components which are difficult to manufacture, such that there are relatively few commercial vendors. Moreover, many of the bend stiffeners are designed in such a manner that the bend stiffeners need to be installed onto cables or pipes before installation occurs. Such issues represent a major technical problem experience with contemporary bend stiffeners.

SUMMARY OF THE INVENTION

The present invention seeks to provide a bend stiffener which is easier to manufacture and easier to install.

Moreover, the present invention seeks to provide a bend stiffener which employs a plurality of mutually similar components for rendering the bend stiffener less expensive to manufacture and easier to install.

According to a first aspect of the invention, there is provided a modular bend stiffener where the modular bend stiffener includes a plurality of inflexible elements defining an elongate passage therein for accommodating one or more pipes or cables, characterized in that the plurality of inflexible elements are coupled together in an elongate series via flexible elements included between adjacent pairs of inflexible elements, wherein the flexible elements include one or more flexible pads for enabling the stiffener to flex laterally relative to an elongate axis of the stiffener when in operation.

The invention is of advantage in that it can be fabricated from multiple standard components which are adjustable in flexibility depending upon hardness of the one or more flexible pads which are employed to construct the flexible elements of the bend stiffener.

Optionally, the bend stiffener is implemented so that the inflexible elements are of a greater axial length relative to the flexible elements. Such relative length ensures that the one or more pipes or cables are well protected against physical damage.

Optionally, the bend stiffener is implemented so that the plurality of inflexible elements and the flexible elements include multiple components which are couplable together for enabling the bend stiffener to be retrofitted to the one or more pipes or cables. Use of multiple components avoids a need to manufacture large unwieldy and expensive component parts. More optionally, the bend stiffener is implemented so that the multiple components of the inflexible elements are fabricated from a metal or metal alloy. Still more optionally, the bend stiffener is implemented so that the multiple components of the inflexible elements are fabricated from composite material.

Optionally, the bend stiffener is implemented so that the pads are implemented as annular components which encircle the one or more pipes or cables in operation.

Optionally, the bend stiffener is implemented so that the one or more flexible pads are implemented to have progressively diminishing hardness from a proximate end element of the stiffener to a distal end element of the stiffener, so that the stiffener is more flexible at its distal end relative to its proximate end, the proximate end being adapted to be anchored.

Optionally, the bend stiffener is implemented so that the inflexible elements include at each end thereof an outwardly tapered annular flange terminating in an associated lip, wherein the lips of the inflexible elements are adapted to engage with annular collars of the flexible elements for coupling the inflexible elements via the flexible elements together, and wherein the annular collars are adapted to encircle and retain the one or more flexible pads disposed between the lips. More optionally, the bend stiffener is implemented so that the one or more flexible pads are of mutually similar physical size, but of mutually different hardness. Still more optionally, the bend stiffener is implemented so that the one or more flexible pads are of mutually similar hardness, but of mutually different physical sizes.

According to a second aspect of the invention, there is provided a method of installing a modular bend stiffener onto one or more pipes or cables, characterized in that the method includes:

(a) installing multiple components parts of inflexible elements onto the one or more pipes or cables to provide a plurality of inflexible elements encircling the one or more pipes or cables; and (b) installing flexible elements between the plurality of inflexible elements to enable the inflexible elements to articulate relative to one another, the flexible elements including one or more flexible pads therein for imparting flexibility thereto and including a coupling arrangement for coupling the flexible elements between the inflexible elements.

Optionally, the method is adapted for retrofitting the bend stiffener after installation of the one or more pipes or cables.

Features of the invention are susceptible to being combined in various combinations without departing from the scope of the invention as defined by the claims.

BRIEF DESCRIPTION OF THE DRAWINGS

Embodiments of the invention will now be described, by way of example only, with reference to the following diagrams wherein.

DETAILED DESCRIPTION

Figure 1:
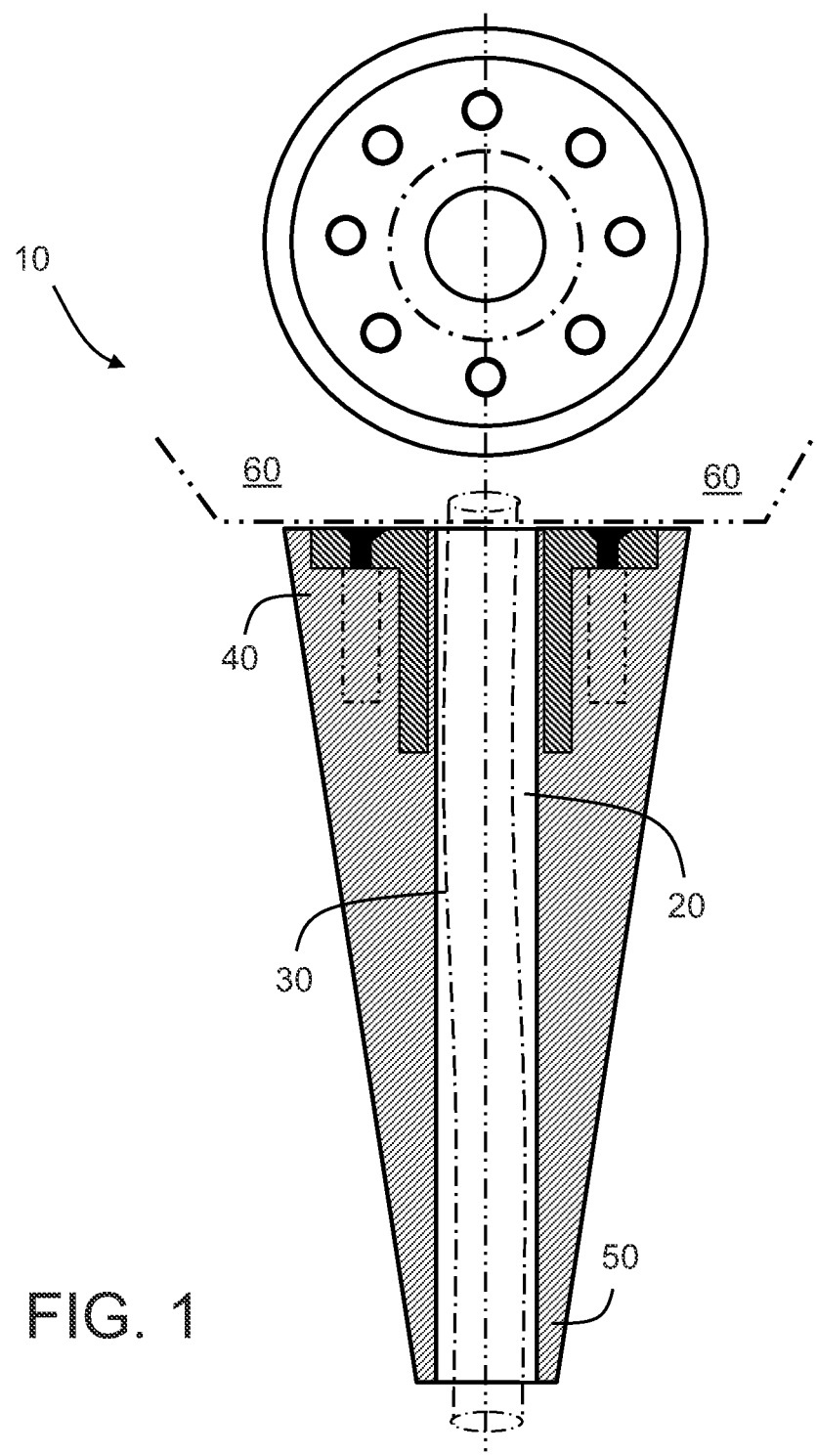
FIG. 1 is an illustration of a conventional contemporary bend stiffener fabricated from a unitary polyurethane component.

Manufacture of conventional bend stiffeners, for example the bend stiffener 10 of FIG. 1, requires special production machinery which leads to high cost and long delivery times for such stiffeners. A conventional bend stiffener is not optimized with respect to transport of cables on drums. As illustrated in FIG. 1, the bend stiffener 10 is moulded as a unitary component which renders it more difficult to handle during transportation and assembly.

A modular bend stiffener pursuant to the present invention is a modular device comprising a plurality of steel, metal alloy or composite components which are coupled or affixed together. Such components are susceptible to being manufactured in standard metal workshops for which there are many commercial vendors. The bend stiffener is implemented as a series of steel, metal alloy or composite elements which are mutually separated by flexible polymeric pads. Optionally, the pads have mutually similar geometrical shape, but are mutually different in their hardness, namely have mutually different E-moduli for example. E-modulus is short for elasticity modulus, also known as Young's modulus. Thus, pads with a greatest hardness are employed where the bend stiffener is attached or anchored to a major object, for example an offshore rig, namely at a proximate end of the bend stiffener, and progressively less hardness towards a distal end of the bend stiffener; the distal end is remote from the proximate end of the bend stiffener. By such an approach, the steel, metal alloy or composite components can be of mutually similar size and shape along the bend stiffener, thereby reducing a need for numerous mutually different parts to be manufactured for implementing the bend stiffener. By such an approach, mechanical properties of the bend stiffener pursuant to the present invention can be rendered similar to those of a conventional bend stiffener, for example manufactured from a single unitary polyurethane component as illustrated in FIG. 1. By employing pads exhibiting various degrees of hardness, the bend stiffener pursuant to the present invention is susceptible to being adapted to numerous different applications. A further benefit provided by a bend stiffener pursuant to the present invention is that it can be adapted to different applications requiring different stiffness characteristics and different hardness distributions along the bend stiffener merely by suitable selection of the flexible pads. A yet further benefit of the present invention is that the bend stiffener can be made as long or as short as required, and even the length of the bend stiffener retrospectively adjusted.

Embodiments of the present invention will now be described with reference to FIG. 2 to FIG. 5.

Figure 2:
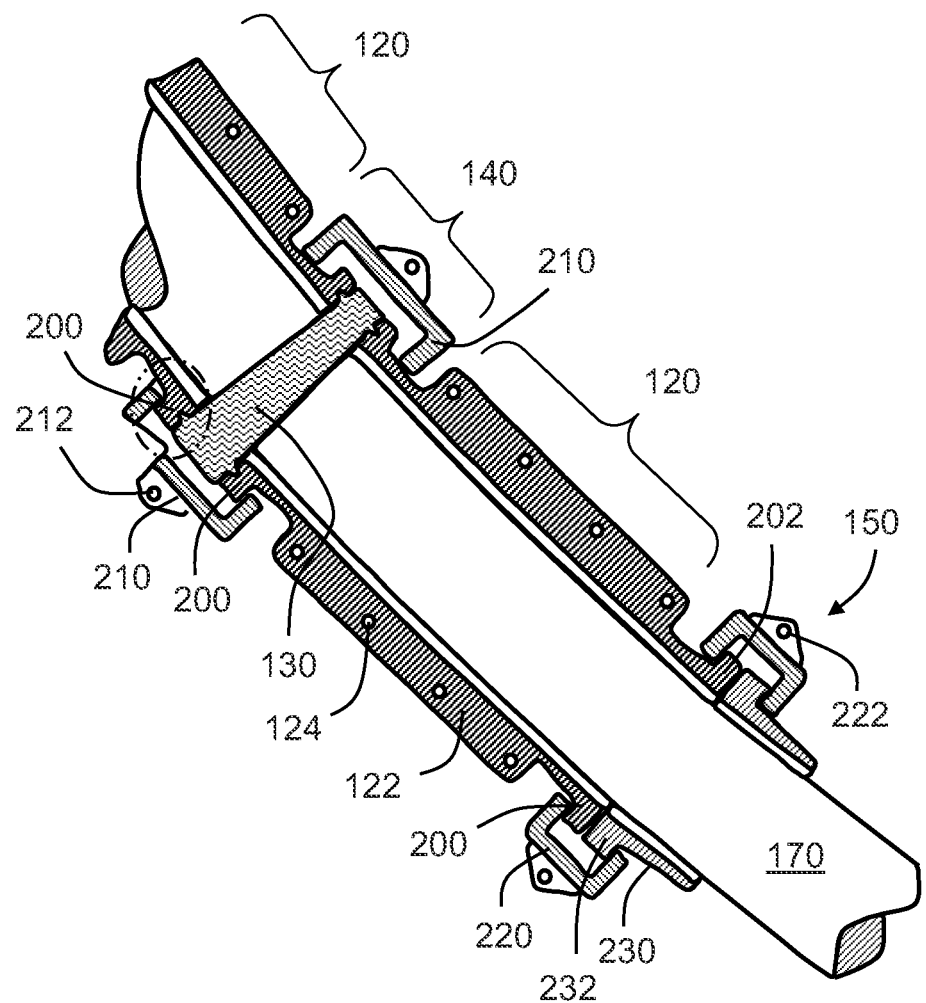
FIG. 2 is a cross-sectional illustration of a portion of a modular bend stiffener pursuant to the present invention in a laterally bent orientation.
Figure 2:
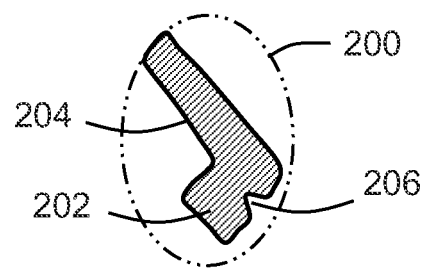
Figure 3:
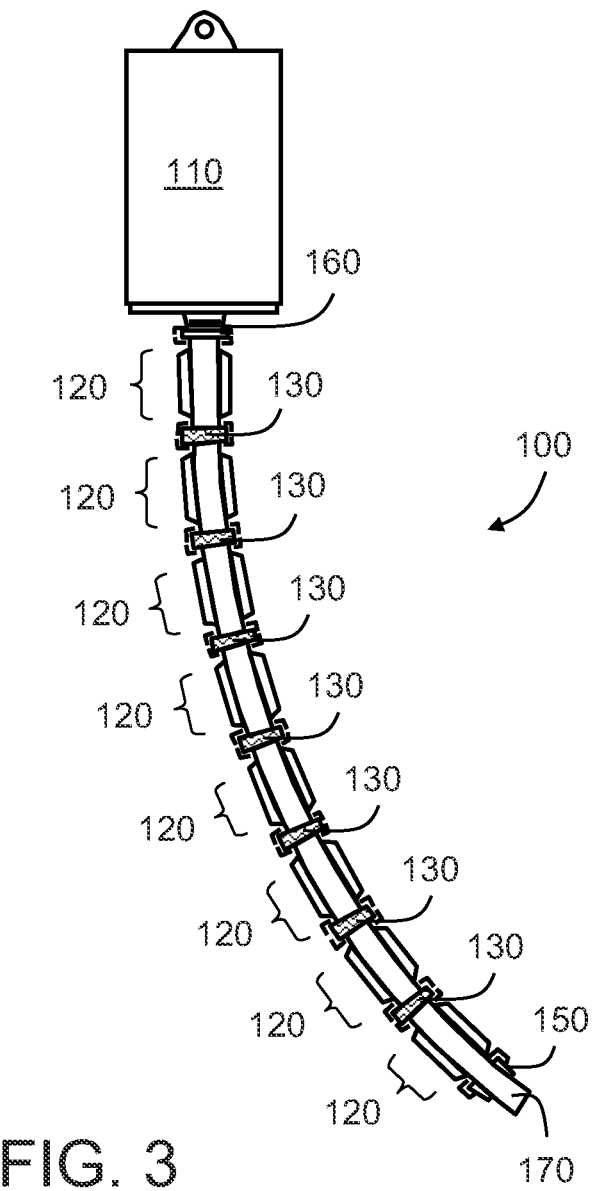
FIG. 3 is a general illustration of the modular bend stiffener of FIG. 2 attached to a major body.

An embodiment of a bend stiffener pursuant to the present invention is indicated generally by 100 in FIG. 3. The bend stiffener 100 is adapted to be attached to a flange 160 of a major component 110, for example a portion of an offshore oil platform, at its proximate end. The bend stiffener 100 is operable to guide one or more cables or pipes 170 from the major component 110 so that they form a curved radius or catenary as illustrated in FIG. 3. The stiffener 100 includes a plurality of inflexible elements 120 including flexural elements 140 disposed therebetween. The flexural elements 140 including associated one or more flexible pads 130 therein as illustrated in FIG. 2.

The elements 120 each include a plurality of shells 122, for example two half shells 122, that are coupled together to encircle the one or more cables or pipes 170. Optionally, more than two shells 122 are employed to implement each element 120; for example four 90° shells 122 are employed when the one or more cables or pipes 170 are of exceptionally large diameter. For example, the shells 122 are mutually coupled together by bolts which are secured through four holes 124 on each side of each shell 122 as illustrated in FIG. 2. The shells 122 are beneficially manufactured from metal, for example Aluminium, Titanium, or metal alloys, for example steel, although other materials, for example plastics materials, are optionally employed; the shells 122 are optionally cast and/or machined. When cast, mutually abutting surfaces of the shells 122 are ground or milled to provide a precise mating. Such plastics materials include, for example, carbon fibre-reinforced composites, rigid glass-filled plastics materials and similar.

At ends of each element 120 as illustrated, there are included annular collars 200, for example integrally formed to the shells 122 as illustrated. The collars 200 have an outwardly projecting lip 202 and an outwardly sloping external annular surface 204 which tapers outwardly towards the lip 202 as illustrated. The lips 202 of the shells 122 are adapted to cooperate with inwardly directed lips of an annular collar 210 in the flexural elements 140 so that neighbouring elements 120 are movably coupled together in series in operation as illustrated in FIG. 2. The annular collar 210 is beneficially also provided as a plurality of shells, for example two shell halves, which are coupled together in operation, for example by bolts secured through holes 212 of the shells of the annular collar 210. Each flexural element 140 includes one or more annular flexible pads 130 which abut in operation onto end surfaces of the lips 202 and are peripherally encircled by their corresponding annular collar 210 as illustrated. The one or more pads 130 beneficially include a central aperture for accommodating the one or more pipes or cables 170. Optionally, each annular flexible pad 130 is implemented as a plurality of parts, for example semicircular halves, for enabling retrofitting of the bend stiffener 100 to the one or more cables or pipes 170. Optionally, the plurality of parts of the flexible pads 130 are bonded together at a time of installation to form a complete annular pad circumferentially surrounding the one or more cables or pipes 170.

A distal end of the bend stiffener 100, remote from the proximate end of the bend stiffener 100, is terminated in a terminating element indicated by 150 in FIG. 2. The terminating element 150 includes a tapered end portion 230 including a lip 232 akin to the aforesaid lip 202. Moreover, the terminating element 150 further includes a peripheral collar 220, for example implementing by a plurality of shells which are coupled together in operation, which includes inwardly directed lips which are operable to engage onto the lip 232 of the tapered end portion 230 and also onto the lip 202 of the neighbouring element 120 as illustrated in FIG. 2.

Figure 4:
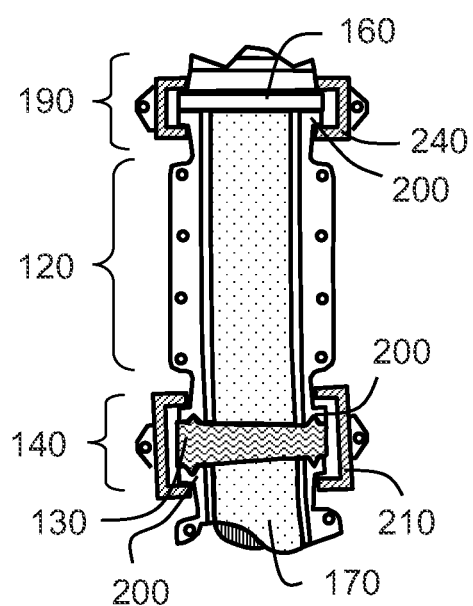
FIG. 4 is a cross-sectional illustration of a proximate end portion of the modular bend stiffener of FIG. 2 whereat the modular bend stiffener is attached to the major body of FIG. 3.

In FIG. 4, the proximate end of the bend stiffener 100 is shown, wherein a terminating element 190 includes an annular collar 240, optionally implemented as a plurality of shells, for example two shell halves, having two inwardly directed lips. The lips of the annular collar 240 are operable to engage with the lip 202 of a proximate shell 122 of a proximate element 120, and also onto a flange 160 of the major component 110 as illustrated. Optionally, the plurality of shells of the annular collar 240 includes holes for enabling the shells to be coupled together, for example during retrofit activities when retrospectively installing the bend stiffener 100.

Figure 5:
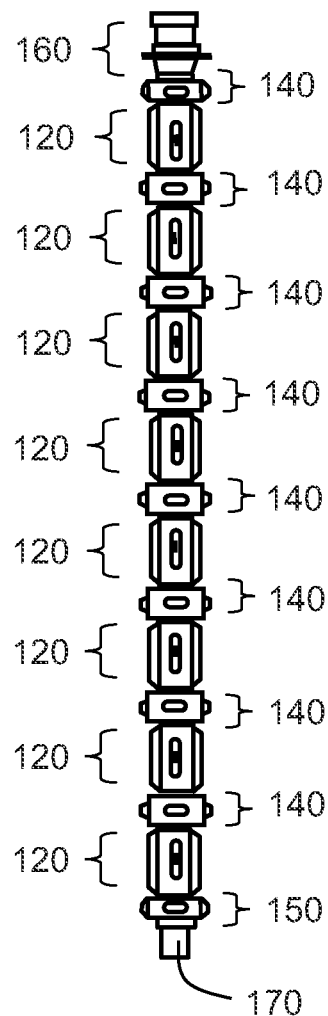
FIG. 5 is an illustration of the bend stiffener of FIG. 2 disposed in a straight configuration, namely not subject to lateral stress.
Figure 6:
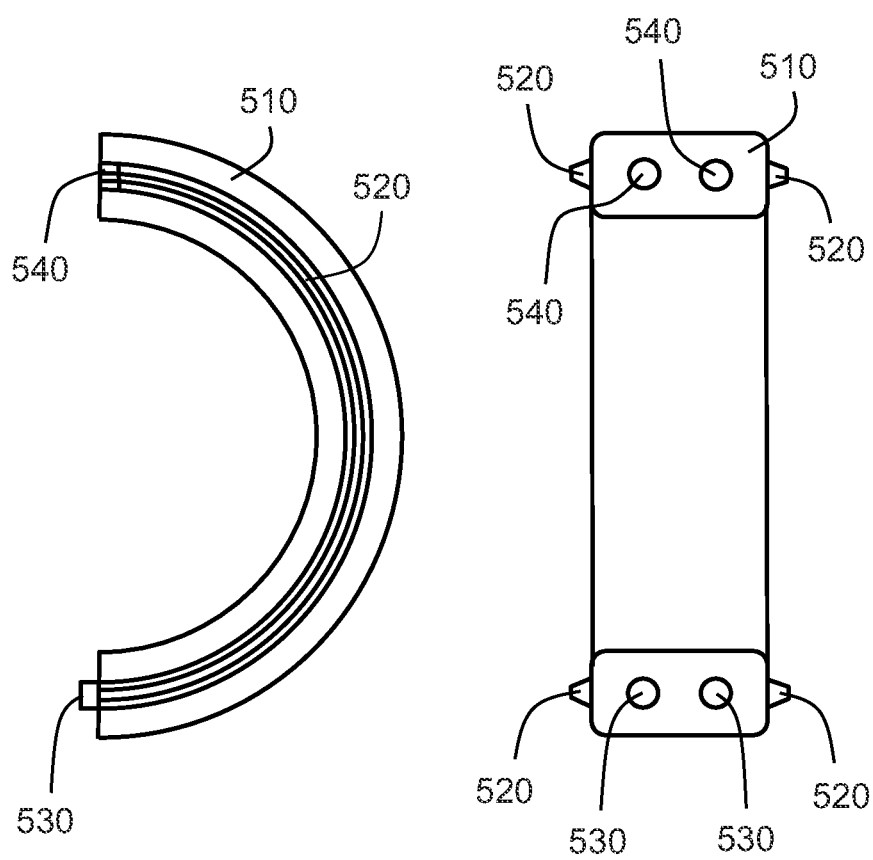
FIG. 6 is an illustration of one half of a flexible pad.
Figure 7:
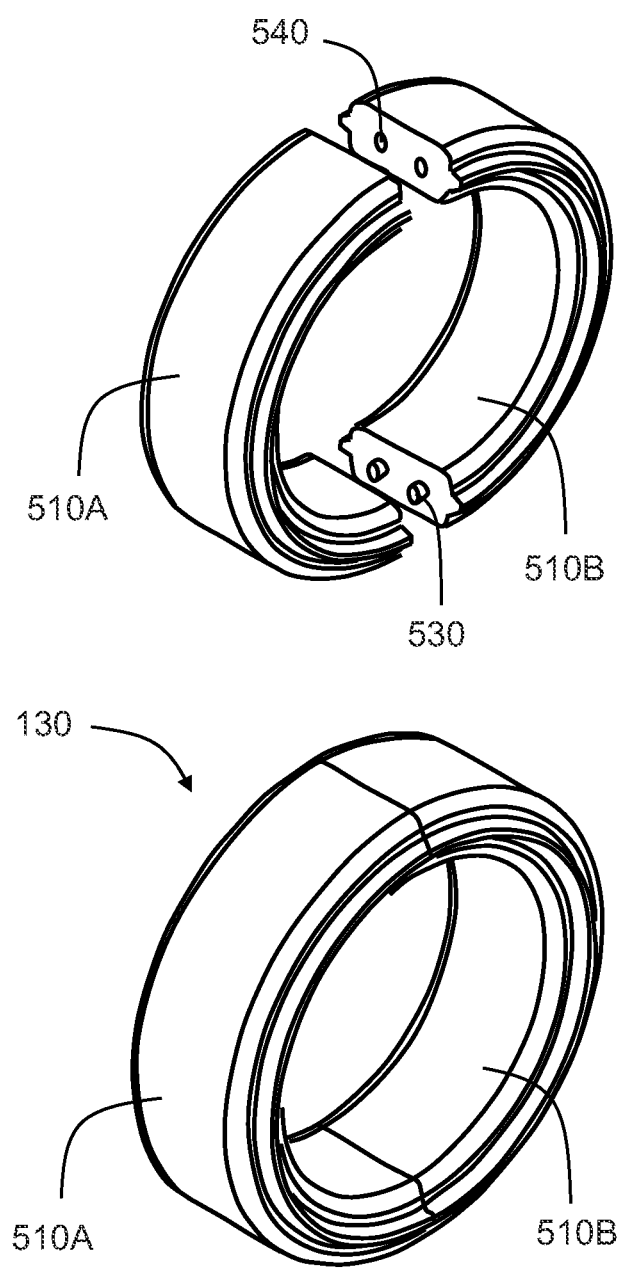
FIG. 7 is an illustration of a flexible pad consisting of two mutually corresponding halves.

The flexible pads 130 are beneficially optionally arranged so that their stiffness progressively reduces from the proximate end of the bend stiffener 100 to the distal end thereof. Optionally, the flexible pads 130 are manufactured to be circularly symmetrical so that the bend stiffener 100 assumes a straight orientation as illustrated in FIG. 5 when lateral forces transverse to an elongate axis of the bend stiffener 100 are not applied. Alternatively, one of more of the flexible pads 130 are arranged to be asymmetrical in order to assist the bend stiffener 100 naturally to assume a curved form in an absence of lateral forces being applied thereto.

The flexible pads 130 are beneficially optionally manufactured from robust flexible polymer plastics materials, for example including polyurethane, polypropylene, Nylon, natural rubber, silicone rubber, filled polymer or any combination thereof. Some examples of possible elastomers that may be used for the present invention include:

| Elastomer | E-modulus |
| --- | --- |
| Butyl Rubber | 0.001-0.002 GPa |
| EVA | 0.01-0.04 GPa |
| Isoprene | 0.0014-0.004 GPa |
| Natural Rubber | 0.0015-0.0025 GPa |
| Neoprene | 0.0007-0.002 Gpa |
| Polyurethane elastomer | 0.002-0.003 GPa |
| Silicone elastomer | 0.005-0.02 GPa |

Suitable E-modulus of the pad material used in the present invention for flexible pads 130 is expected to be within the range of 0.0007-0.1 GPa. More particularly, this range is expected to be within 0.0007-0.04 GPa.

The elements and components designated as 'inflexible elements' 120, 122 are in the present invention expected to be within the range of 10-500 GPa.

The flexible pads 130 are beneficially optionally arranged so that their physical sizes progressively are modified from the proximate end of the bend stiffener 100 to the distal end thereof.

The bend stiffener 100 is susceptible to being employed in a broad range of different industries, for example telecommunications cables, power cables, water pipes, gas pipes, moorings to mention a few. The invention is suitable for use, amongst others, in petrochemicals industries, in offshore oil and gas industries, in public utilities, for cables in transport systems and so forth.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A modular bend stiffener comprising:
   a plurality of inflexible elements defining an elongate passage therein for accommodating one or more pipes or cables,
   wherein said plurality of inflexible elements are coupled together in an elongate series via flexible elements included between adjacent pairs of inflexible elements,
   wherein said flexible elements are one or more flexible pads placed in elongate series continuity with said inflexible elements and without having any overlapping area therewith, said flexible pads enabling said stiffener to flex laterally relative to an elongate axis of the stiffener when in operation,
   wherein said one or more flexible pads are implemented to have progressively diminishing hardness from a proximate end element of said stiffener to a distal end element of said stiffener, so that said stiffener is more flexible at its distal end relative to its proximate end, said proximate end being adapted to be anchored.

2. The bend stiffener as claimed in claim 1, wherein said inflexible elements are of a greater axial length relative to said flexible elements.

3. The bend stiffener as claimed in claim 1, wherein the plurality of inflexible elements and the flexible elements include multiple components which are couplable together for enabling said bend stiffener to be retrofitted to said one or more pipes or cables.

4. The bend stiffener as claimed in claim 3, wherein said multiple components of said inflexible elements are fabricated from a metal or metal alloy.

5. The bend stiffener as claimed in claim 3, wherein said multiple components of said inflexible elements are fabricated from composite material.

6. The bend stiffener as claimed in claim 1, wherein said pads are implemented as annular components which encircle said one or more pipes or cables in operation.

7. The bend stiffener as claimed in claim 1, wherein said inflexible elements include at each end thereof an outwardly tapered annular flange terminating in an associated lip, wherein said lips of said inflexible elements are adapted to engage with annular collars of said flexible elements for coupling said inflexible elements via said flexible elements together, and wherein said annular collars are adapted to encircle and retain said one or more flexible pads disposed between said lips.

8. The bend stiffener as claimed in claim 7, wherein said one or more flexible pads are of mutually similar physical size, but of mutually different hardness.

9. The bend stiffener as claimed in claim 7, wherein said one or more flexible pads are of mutually similar hardness, but of mutually different physical sizes.

10. A method of installing a modular bend stiffener onto one or more pipes or cables, said method comprising the steps of:
    (a) installing multiple components parts of inflexible elements onto the one or more pipes or cables to provide a plurality of inflexible elements encircling said one or more pipes or cables,
    (b) installing flexible elements in series continuity and without overlap therewith between said plurality of inflexible elements to enable said inflexible elements to articulate relative to one another, said flexible elements including one or more flexible pads therein for imparting flexibility thereto and including a coupling arrangement for coupling said flexible elements between said inflexible elements wherein said one or more flexible pads are installed such that they have progressively diminishing hardness from a proximate end element of said stiffener to a distal end element of said stiffener, so that said stiffener is more flexible at its distal end relative to its proximate end, said proximate end being adapted to be anchored.

11. The method as claimed in claim 10, adapted for retrofitting said bend stiffener after installation of said one or more pipes or cables.

* * * * *